United States Patent [19]

Staller

[11] 4,431,286
[45] Feb. 14, 1984

[54] PHOTOGRAPHIC EXPOSURE CONTROL SYSTEM HAVING SELECTABLE AMBIENT AND FLASH MODES

[75] Inventor: Norman D. Staller, Beverly, Mass.

[73] Assignee: Polaroid Corporation, Cambridge, Mass.

[21] Appl. No.: 311,075

[22] Filed: Oct. 13, 1981

[51] Int. Cl.³ .............................................. G03B 7/00
[52] U.S. Cl. .................................... 354/435; 354/413; 354/149.11
[58] Field of Search .................... 354/139, 149, 29, 33

[56] References Cited

U.S. PATENT DOCUMENTS

| | | | |
|---|---|---|---|
| 3,757,643 | 9/1973 | Burgarella | 95/11 R |
| 3,942,183 | 3/1976 | Whiteside | 354/29 |
| 3,972,057 | 7/1976 | Whiteside | 354/149 |
| 3,972,058 | 7/1976 | Johnson et al. | 354/149 |
| 4,008,481 | 2/1977 | Whiteside | 354/149 |
| 4,023,187 | 5/1977 | Shenk | 354/27 |
| 4,040,069 | 8/1977 | Pope | 354/149 |
| 4,040,072 | 8/1977 | Johnson et al. | 354/173 |
| 4,058,818 | 11/1977 | Johnson et al. | 354/149 |
| 4,104,653 | 8/1978 | Johnson et al. | 354/27 |
| 4,147,418 | 4/1979 | Whiteside et al. | 354/27 |
| 4,192,587 | 3/1980 | LaRocque et al. | 354/27 |
| 4,315,675 | 2/1982 | Johnson | 354/26 |
| 4,351,593 | 9/1982 | Johnson et al. | 214/27 |

*Primary Examiner*—Russell E. Adams
*Attorney, Agent, or Firm*—Edward S. Roman

[57] ABSTRACT

A photographic exposure control system of the type embodying scanning shutter blade elements includes a control blade selectively actuatable in accordance with whether the photographic apparatus is utilized in an ambient or artificial scene-lighted mode of operation for controlling which of two separate sets of photocell sweep secondary apertures in the shutter blade elements will direct scene light to a photoresponsive element while at the same time controlling a maximum effective primary aperture to which the shutter blade elements are allowed to progressively increase.

16 Claims, 8 Drawing Figures

PHOTOGRAPHIC EXPOSURE CONTROL SYSTEM HAVING SELECTABLE AMBIENT AND FLASH MODES

BACKGROUND OF THE INVENTION

1. Field of the Invention

This invention relates generally to a photographic exposure control system having selectively actuatable ambient and flash modes and, more particularly, to a photographic exposure control system where the exposure control mode is determined as a function of whether the photographer chooses to light the scene by the available ambient scene light or artificial illumination.

2. Description of the Prior Art

Instant cameras embodying "scanning type" shutter blade arrangements have been used in conjunction with fixed focus objective lenses to provide a camera which is simple to operate. One camera of this type is currently marketed by Polaroid Corporation under the trade name "OneStep". This camera utilizes film units of the self-processable type which are automatically processed and ejected from the camera by way of a motorized drive mechanism. Thus, the photographer need only depress a single button to effect both the exposure and processing of the film units.

An exposure control for a camera of the aforementioned type having scanning shutter blade elements driven by a walking beam to provide a progressive variation in effective exposure and light sensing apertures is disclosed in U.S. Pat. No. 4,104,653, entitled "Scanning Shutter Blade Arrangement with Ambient and Flash Ranges", by Bruce K. Johnson et al., issued Aug. 1, 1978, in common assignment herewith and now incorporated by reference herein. Control is provided by the aforementioned exposure control system so that, when in an artificial scene-lighted mode of operation, the scanning shutter blades define an effective exposure aperture which progressively increases toward a maximum f/ stop at the largest aperture within a range of progressively increasing sized apertures. By contrast, when in a natural ambient scene-lighted mode of operation, the control provides for the scanning shutter blades to define an effective exposure aperture which progressively increases to a predetermined aperture size less than the maximum effective aperture size to which the shutter blade elements progress during the artificial scene-lighted mode. In this manner, there is maintained an increased depth of field during the ambient scene-lighted mode of operation where the camera-to-subject distances would be expected to be greater than during the artificial scene-lighted mode. Exposure control is provided by a photoresponsive element which receives incident scene light by way of a single, effective photocell sweep aperture defined by a pair of overlapping secondary apertures in respective blade elements.

U.S. Pat. No. 4,147,418, entitled "Photographic Exposure Control System with Independent Ambient and Artificial Illumination Control Modes", by George D. Whiteside, issued Apr. 3, 1979, in common assignment herewith and now incorporated by reference herein, shows an exposure control system embodying a scanning type shutter blade arrangement wherein the scene light is admitted to a photoresponsive element through a first pair of overlapping photocell sweep apertures during the ambient scene-lighted mode of operation and through a second pair of overlapping photocell sweep apertures during the artificial scene-lighted mode of operation. Thus, two entirely independent and different sets of photocell sweep secondary apertures control the admission of scene light to the photoresponsive element in correspondence with the scene light admitted by the primary aperture to the film plane solely as a function of whether the camera is operated in an ambient scene-lighted mode or an artificially scene-lighted mode. However, in this arrangement the maximum size to which the primary scene light admitting aperture is allowed to progressively increase is the same for either the ambient scene-lighted mode or the artificially scene-lighted mode, and hence there is provided no increased depth of field by limiting the size to which the scanning shutter blade elements may progressively open during the ambient scene-lighted mode of operation which would be particularly advantageous for a camera of the fixed focus type such as the aforementioned OneStep camera.

Therefore, it is a primary object of this invention to provide a photographic exposure control system embodying a scanning shutter blade arrangement in which the scene light is admitted to a photoresponsive element by way of a first pair of overlapping photocell sweep secondary apertures during an ambient scene-lighted mode of operation and in which the scene light is admitted to the photoresponsive element by way of a second pair of overlapping photocell sweep secondary apertures during the artificial scene-lighted mode of operation.

It is a further object of this invention to provide an exposure control system with a scanning shutter blade system wherein the range within which the primary aperture is allowed to progressively increase is limited during the ambient scene-lighted mode of operation in comparison to the range within which the primary aperture is allowed to progressively increase during the artificial scene-lighted mode of operation.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

A photographic camera apparatus for use in either an ambient scene-lighted mode or an artificially scene-lighted mode and of the type including means for mounting a photographic film material at a given focal plane also comprises a blade mechanism together with means for mounting the blade mechanism for displacement between a first arrangement wherein it precludes scene light from reaching the film plane and a second arrangement wherein it defines a maximum sized aperture. The blade mechanism serves to define a first range of progressively increasing sized apertures as it moves from its first arrangement to its second arrangement. Control means cooperatively associated with the blade mechanism and the mounting means are provided and respond to camera operation in the ambient scene-lighted mode by limiting displacement of the blade mechanism along the predetermined path to an intermediate arrangement wherein it defines an aperture size less than the maximum aperture size while simultaneously detecting scene light in the manner maintaining a first select corresponding relationship between the detected scene light and the scene light admitted to the focal plane by the blade mechanism as it moves through the range of apertures between the first and intermediate arrangements. The control means further responds to camera operation in the artificially scene-lighted mode by allowing displacement of the blade mechanism along the predetermined path between its first and second arrangements while simultaneously detecting light in a manner maintaining a second select corresponding relationship between the detected scene light and the scene light admitted to the focal plane independently of the first selected corresponding relationship as the blade mechanism moves through the range of apertures between the first and second arrangements. There is also provided a selectively actuatable drive means for initially displacing the blade mechanism from its first arrangement towards its second arrangment and for thereafter displacing the blade mechanism back toward its first arrangement in response to the detected scene light to define an exposure cycle.

The blade mechanism preferably includes two overlapping shutter blade elements each having a respective primary aperture therethrough. The primary apertures, in turn, are cooperatively arranged to define the range of progressively increasing sized apertures. The control means includes a control blade mounted in overlapping relation with respect to the overlapping shutter blade elements for movement in correspondence with one of the overlapping shutter blade elements. The control means responds to the ambient scene-lighted mode by positioning the control blade to engage a fixed stop member as the blade elements move through the range of apertures so as to stop the blade elements at an intermediate position. The control means further responds to the artificially scene-lighted mode by positioning the control blade to bypass the stop member as the blade elements move through their range of apertures.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENTS

Referring now to FIGS. 1-7, there are shown generally at 10 a photographic exposure control shutter apparatus disposed about a baseblock casting 12, which can be selectively machined to support the various components of a photographic exposure control mechanism in accordance with this invention. Centrally disposed within the baseblock casting 12, there is provided a light entry exposure opening 14 which defines the maximum available exposure aperture of the system. An objective or taking lens (not shown) can be provided in overlapping relation with respect to the light entry opening 14. In accordance with this invention, the objective lens is preferably of the fixed focus type, although the scope of the invention is by no means so limited and would also be applicable to lenses of the variable focus type. Image carrying light rays from the objective lens which are transmitted by the shutter apparatus in a manner to be subsequently described are thereafter directed to a rearwardly positioned film plane (not shown) by way of a reflecting mirror (also not shown), all of which are stationed within a suitable lighttight film exposure chamber (also not shown) in a manner as is more fully described in U.S. Pat. No. 4,040,072, entitled "Shutter Latch Arrangement Releasable Through Shutter Blade Actuation and Resettable Through Film Advancement", by Bruce K. Johnson et al., issued Aug. 2, 1977, in common assignment herewith and now incorporated by reference herein.

The exposure control apparatus 10 comprises two overlapping shutter blade elements 16 and 18 of the so-called "scanning type" which will be subsequently described in greater detail herein. A pair of scene light admitting primary apertures 20 and 22 are provided, respectively, in the blade elements 16 and 18 to cooperatively define a progressive variation of effective aperture openings in accordance with simultaneous longitudinal and lateral displacement of one blade element with respect to the other blade element in a manner as is fully described in U.S. Pat. No. 3,942,183, entitled "Camera with Pivoting Blades", by George D. Whiteside, issued Mar. 2, 1977, in common assignment herewith, and now incorporated by reference herein. The apertures 20 and 22 are selectively fitted so as to overlap light entry exposure opening 14 thereby defining a gradually varying effective primary aperture size as a function of the position of the blade elements 16 and 18.

Means are provided for mounting the shutter blade elements 16 and 18 for displacement along a predetermined path between a first arrangement (see FIG. 1) wherein the shutter blade elements 16 and 18 preclude scene light from reaching the film plane and a second arrangement (see FIG. 7) wherein the primary apertures 20 and 22 overlap to cooperatively define a maximum size effective primary aperture to admit scene light to the film plane. The blade mechanism mounting means comprises a pivot pin or stud 34 projecting outward from the baseblock casting 12 at a location spaced laterally apart from the light entry exposure opening 14 so as to pivotally and translatably engage elongated slots 36 and 38 formed in respective shutter blade elements 16 and 18. Pin 34 may be integrally formed with the baseblock casting 12, and blade elements 16 and 18 may be retained in engaging relation with respect to the pin 34 by any suitable means such as peening over of the pin 34.

The means for mounting the blade mechanism additionally includes a walking beam 40 pivotally connected to respective extended portions from each shutter blade element 16 and 18. The walking beam 40, in turn, is disposed for rotation relative to the baseblock casting 12 by pivotal connection to a projecting pivot pin or stud 42 which may also be integrally formed with the baseblock casting 12 at a position spaced laterally apart from the light entry exposure opening 14. The walking beam 40 may be pivotally retained with respect to the pin 42 by any conventional means such as an E ring (not shown). In the preferred mode, the walking beam 40 is pivotally connected at its distal ends to the shutter blade elements 16 and 18 by respective pin members 44 and 46, which extend laterally outward from the walking beam 40. Thus, clockwise rotation of the walking beam 40 operates to move the shutter blade elements 16 and 18 in directions which progressively enlarge the effective primary aperture cooperatively defined by the overlapping apertures 20 and 22 over the light entry exposure opening 14 thereby defining a range of progressively increasing sized effective primary apertures for admitting the scene light to the film plane.

Figure 1:
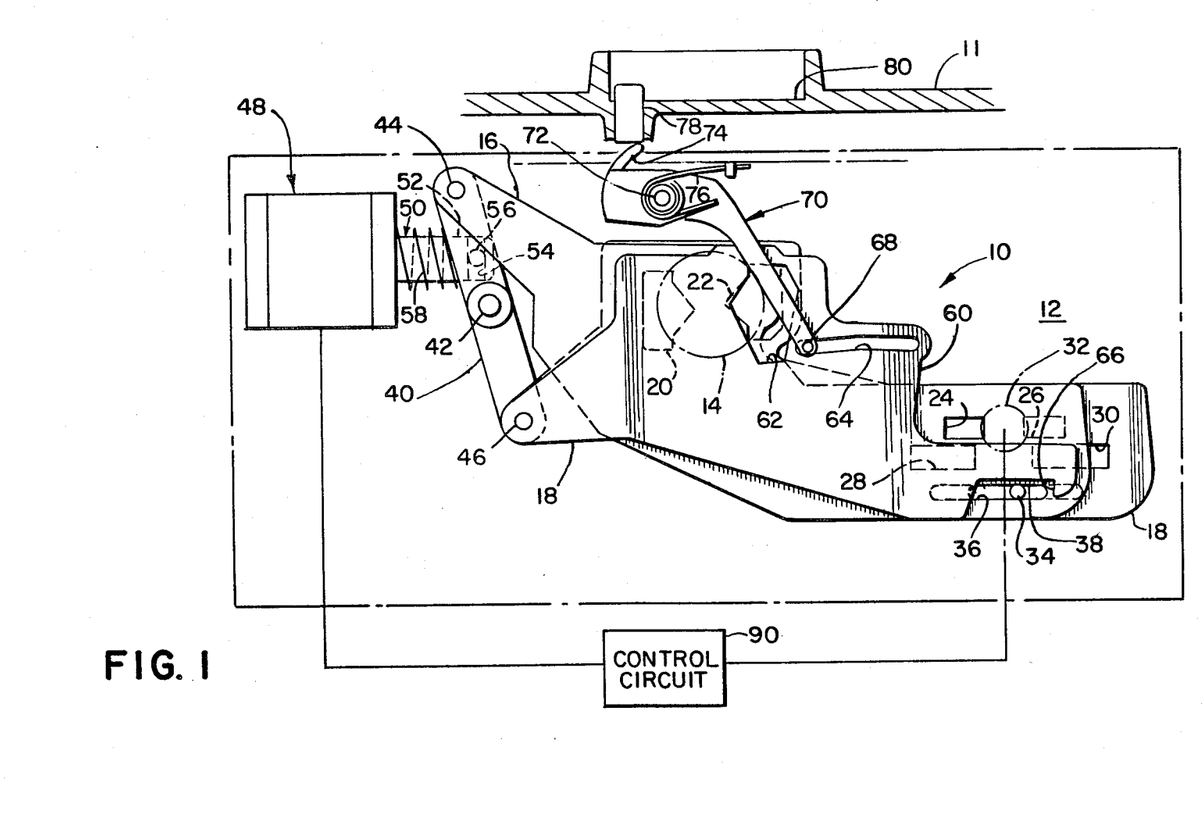
FIG. 1 is a front elevational view of a shutter blade mechanism embodying the control features of this invention.
Figure 7:
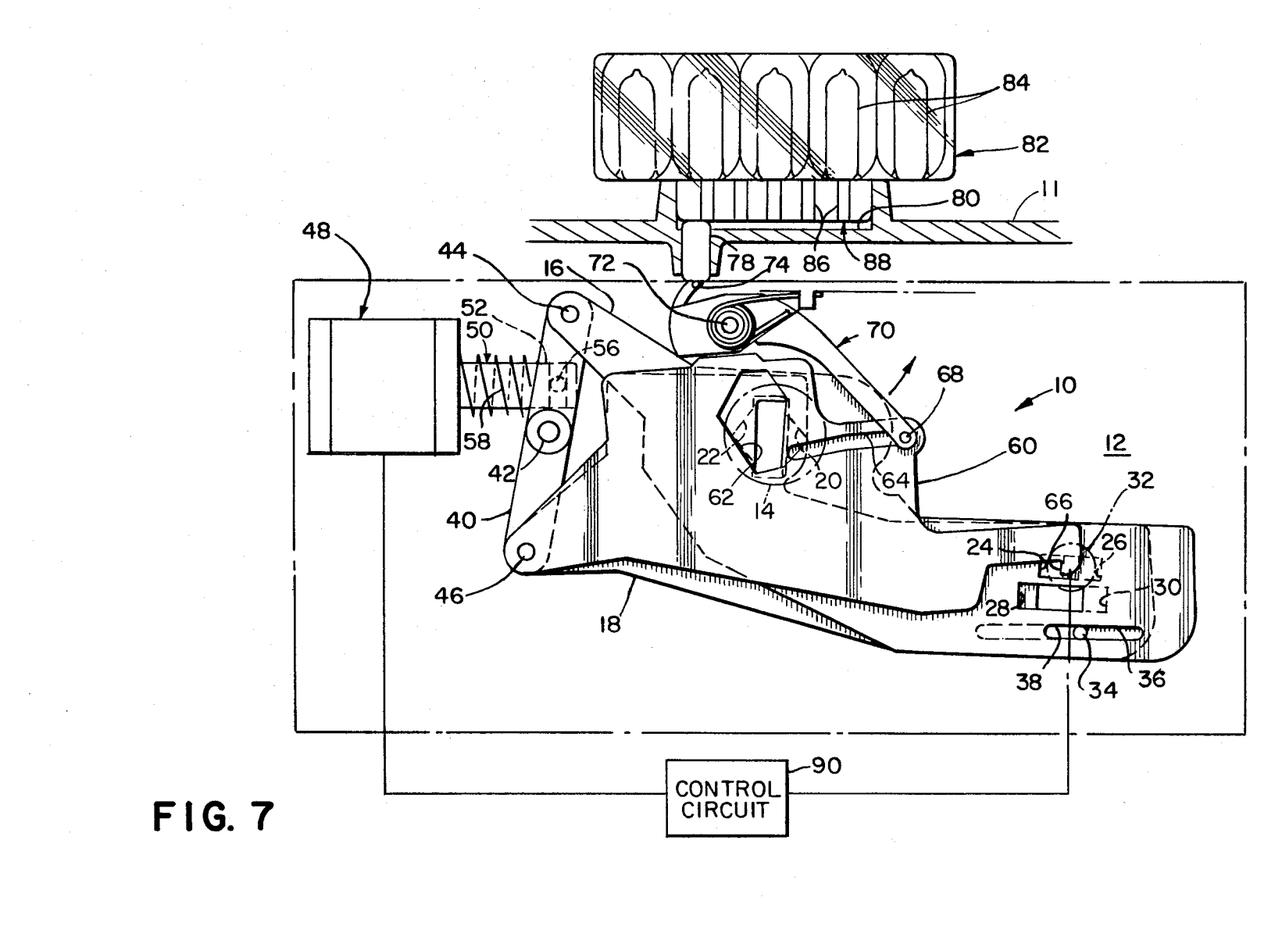
FIG. 7 is a front elevational view of the shutter blade mechanism embodying the control features of this invention as shown in FIG. 1 at still another position from that of FIGS. 1, 2, 3, 4, 5, and 6.
Figure 8:
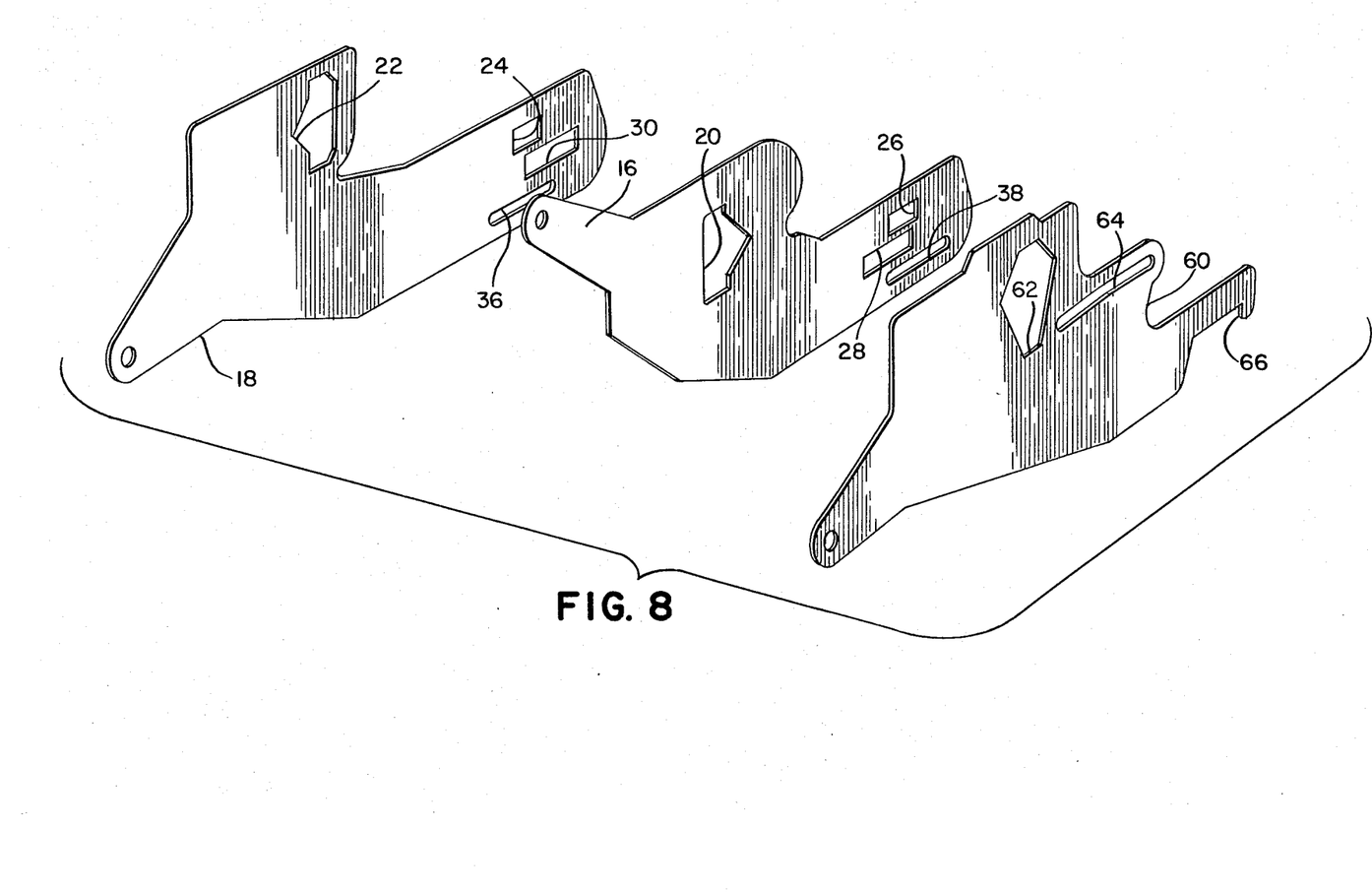
FIG. 8 is a perspective view of the shutter blade elements of FIG. 1.

Selectively actuatable drive means are provided for initially displacing the blade mechanism from its scene light blocking arrangement as shown in FIG. 1 towards its scene light admitting arrangement as shown in FIG. 7 and for thereafter displacing the blade mechanism back to its initial scene light blocking first arrangement in response to the film being suitable exposed to define an exposure cycle. Such drive means comprise a tractive electromagnetic device in the form of a solenoid 48 which is employed to rotate the walking beam 40 in a counterclockwise direction thereby displacing the blade elements 16 and 18 from their scene light admitting second arrangement back to the scene light blocking first arrangement. The solenoid 48 includes an internally disposed cylindrical plunger unit 50 which retracts inwardly into the body of the solenoid upon energization of the solenoid coil winding. A solenoid plunger 50 includes an end cap 52 at the outside end thereof together with a vertical slot or groove 54 within the end cap for loosely engaging a pin 56 extending outwardly from the walking beam 40. In this manner, the solenoid plunger 50 is affixed to the walking beam 40 so that longitudinal displacement of the plunger 50 will operate to rotate the walking beam about the pivot pin 40 so as to appropriately displace the shutter blades 16 and 18. The drive means may additionally include a helical compression spring 58 around the plunger 50 so as to continuously urge the end cap 52 outwardly of the solenoid 48, thereby also continuously urging the blade elements 16 and 18 into positions defining the largest effective primary aperture over the light entry exposure opening 14. As will be readily understood, in some shutter blade arrangements it may be preferable to utilize a tension spring in place of the compression spring 58 in a manner as is shown in U.S. Pat. No. 3,942,183, supra. Thus, with the spring connection herein described, the exposure control blade apparatus 10 is biased to continuously urge the shutter blade elements 16 and 18 into an open scene light unblocking orientation.

In the present arrangement, the shutter blades 16 and 18 are drawn from their scene light unblocking open arrangement as shown in FIG. 7 to their scene light blocking closed arrangement as shown in FIG. 1 when the solenoid 48 is energized. Consequently, energization of the solenoid 48 prevents the shutter blades 16 and 18 from moving towards their maximum effective primary aperture defining arrangement under the urging of compression spring 58. However, it should be readily understood that the exposure control system of this invention would be equally applicable to photographic systems where the blades 16 and 18 are spring biased in a normally closed position. However, since in the preferred embodiment the shutter blade elements 16 and 18 are spring biased to move towards their scene light unblocking arrangement, it would otherwise be necessary to maintain the solenoid in a state of continued energization in order to hold the shutter blade elements 16 and 18 in their scene light blocking arrangement as shown in FIG. 1. Such continued energization of the solenoid 48, however, would present an intolerable power drain on the camera battery, particularly if the solenoid 48 had to be continuously energized even when the camera apparatus were not in use. In order to avoid this continued energization of the solenoid 48, there is provided a latch mechanism (not shown) which operates normally to latch the shutter blade mechanism in its scene light blocking arrangement as shown in FIG. 1, which automatically unlatches the shutter blade mechanism to permit the shutter blade elements 16 and 18 to be moved toward their scene light unblocking arrangement as shown in FIG. 7 in order to commence a photographic exposure cycle, and which further automatically responds at the termination of an exposure cycle to relatch the blade elements 16 and 18 in their scene light blocking arrangement so as to permit deenergization of the solenoid 48. The manner in which the aforementioned latch operates is more fully described in U.S. Pat. No. 4,040,072, supra.

The photographic camera apparatus of this invention may be used in an artificial scene-lighted mode of operation by connecting a source of artificial illumination which preferably comprises a linear array of flash lamps as shown generally at 82. The linear flash array includes a plurality of individually spaced apart flash lamps 84 which respectively connect to a plurality of spaced apart terminal pads or elements 86 disposed on a connecting blade 88. The linear flash array 82 may be releasably connected with respect to the camera housing by way of a receiving socket 80 which also includes a plurality of spaced apart terminal pads or elements. The linear flash array 82 may be inserted and withdrawn from the receiving socket 80 in a manner as is fully described in U.S. Pat. No. 3,757,643, entitled "Photoflash Apparatus", by John P. Burgarella, issued Sept. 11, 1973, a common assignment herewith and now incorporated by reference herein.

Means are cooperatively associated with the shutter blade elements 16 and 18 for detecting scene light during an exposure cycle. Such scene light detecting means comprise a first pair of spaced apart photocell sweep secondary apertures 24 and 28 on blade element 16 together with a second pair of spaced apart photocell sweep secondary apertures 26 and 30 on blade element 18. The aforementioned photocell sweep secondary apertures 24, 26, 28 and 30 are aligned to transmit scene light received from the scene in a manner to be subsequently described herein. A photoresponsive element 32 is stationed behind the photocell sweep secondary apertures in position to receive scene light transmitted by the photocell sweep secondary apertures. The photoresponsive element 32 may be a photovoltaic cell of the type generating an output signal in correspondence with the levels of scene light intensity incident thereon. The photoresponsive element 32 is coupled to a light integrating and control circuit 90 which may include an operational amplifier having a feedback path comprising an integrating capacitor connected in a well-known manner for providing a linear output signal corresponding to the time integration of scene light intensity incident to the photoresponsive element 32. The light integrating and control circuit 90 may also include a Schmidt trigger which is triggered to provide a control signal when the output signal corresponding to the time integration of the scene light intensity incident to the photoresponsive element reaches a preselected level corresponding to a preselected exposure value. The light integrating and control circuit 90, in turn, is connected to the solenoid 48 in order to energize the solenoid in correspondence to the film receiving sufficient light to establish a select exposure value.

The exposure control system of this invention additionally includes a control blade 60 mounted in overlapping relation with respect to the shutter blades 16 and 18 from movement in correspondence with the shutter blade 18. The control blade 60 includes a primary aperture 62 therethrough which generally overlaps the scene light admitting primary aperture 22 and moves in correspondence therewith by virtue of the control blade 60 being connected to the walking beam 40 by the same pin member 46 which connects the shutter blade element 18 to the walking beam 40. The control blade 60 additionally includes an elongated slot 64 therethrough which slidably engages a pin 68 extending laterally outward from one distal end of a bell crank 70. The bell crank 70 is disposed for pivotal movement with respect to the baseblock casting 12 by a mounting pin 72 which may also be integrally molded with respect to the baseblock casting 12. The other distal end of the bell crank 70 engages the lower end of a rod 78 which is slidably mounted with respect to the baseblock casting 12. The other end of the rod 78 extends through the bottom of the linear flash array receiving socket 80 to be actuated upon insertion of the linear flash array 82 in the manner of this invention to be subsequently described. The bell crank 70 is biased to rotate in a counterclockwise direction by means of a resilient leaf spring as shown at 76. The other end of the control blade 60 defines an integral hook portion as shown at 66 for selective engagement with the pivot pin 34 in the manner of this invention now to be described.

Figure 2:
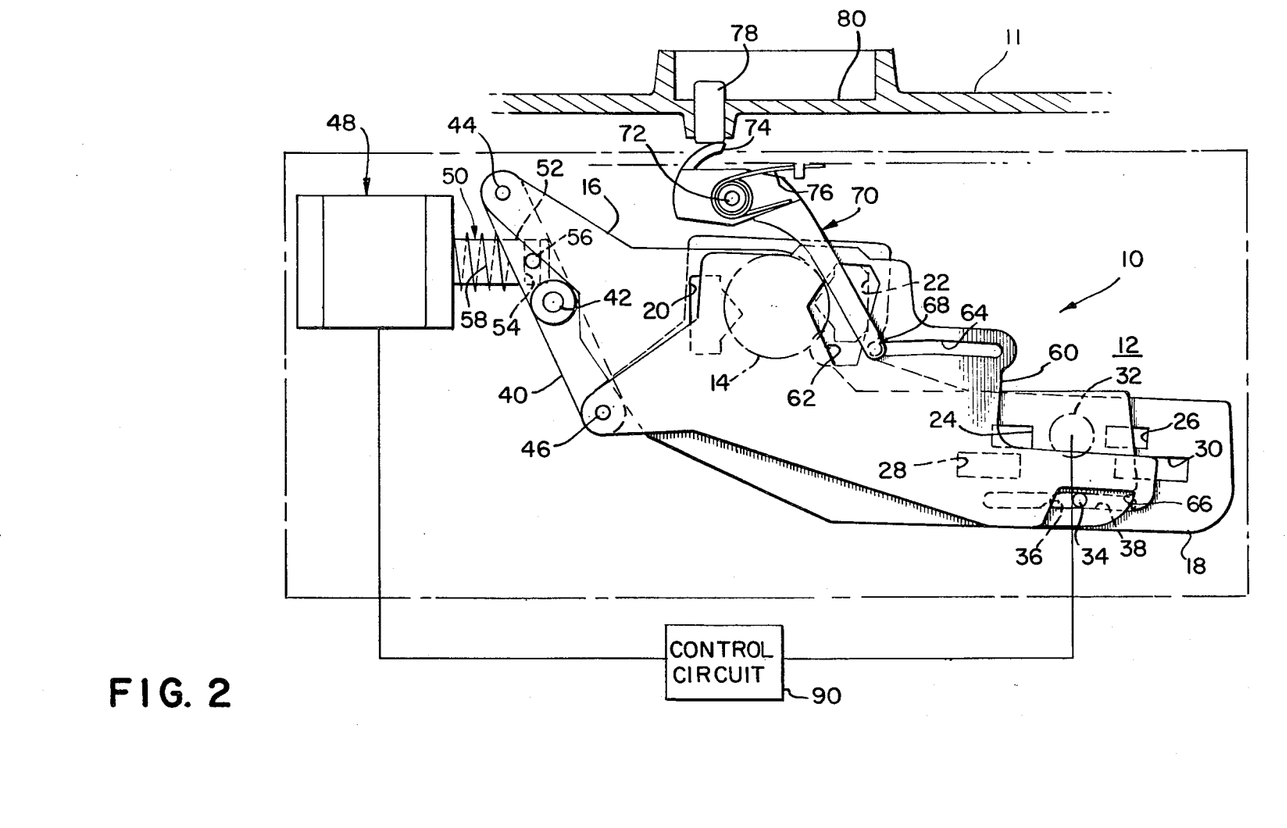
FIG. 2 is a front elevational view of the shutter blade mechanism embodying the control features of this invention as shown in FIG. 1 in a different position from that of FIG. 1.
Figure 3:
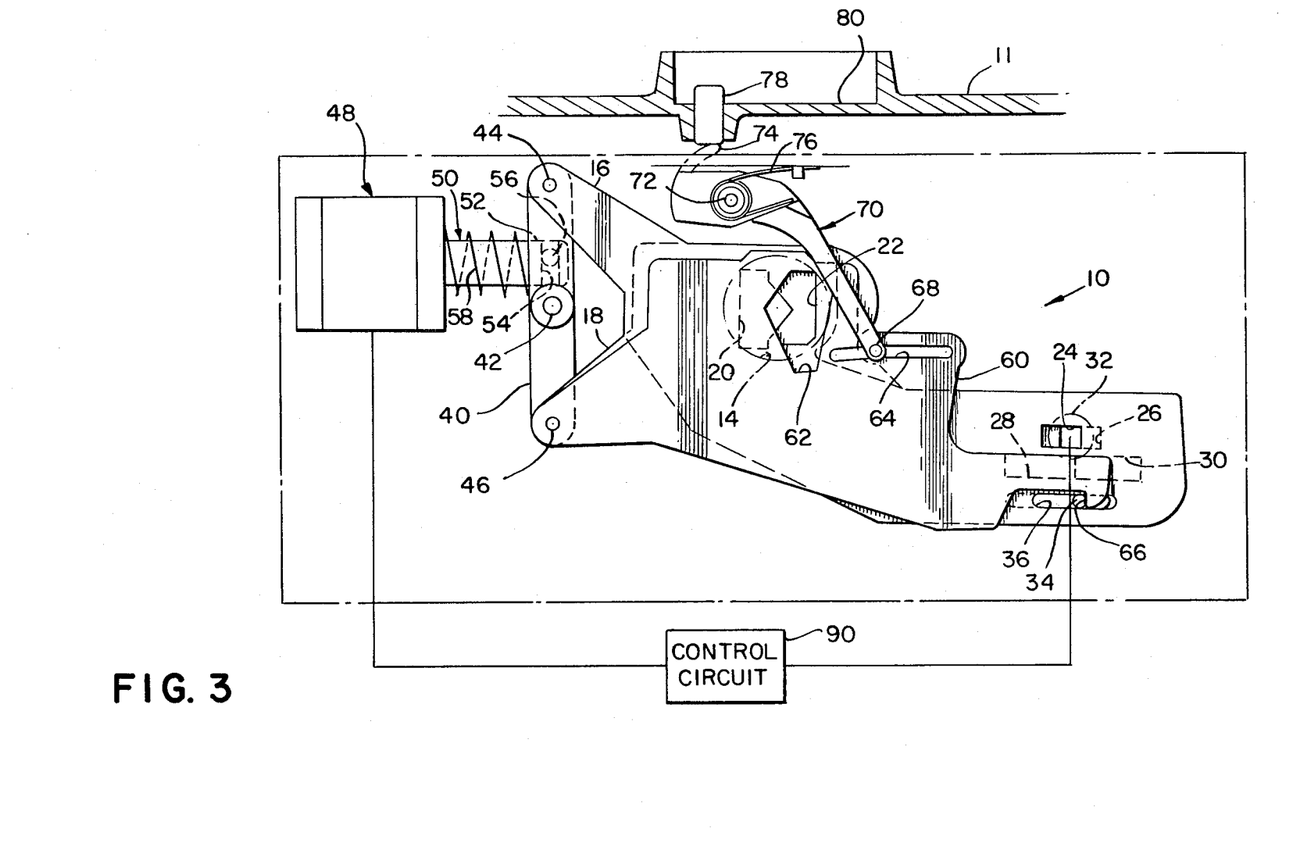
FIG. 3 is a front elevational view of the shutter blade mechanism embodying the control features of this invention as shown in FIG. 1 at still another position from that of FIGS. 1 and 2.

Operation of the photographic apparatus 10 in an ambient scene lighted mode may commence upon the photographer actuating a shutter button so as to energize the solenoid 48 and retract the plunger 50 inwardly to rotate the walking beam 40 in a counterclockwise direction from its position as shown in FIG. 1 to its position as shown in FIG. 2 in a manner as is fully described in U.S. Pat. No. 4,040,072, supra. This limited counterclockwise movement of the walking beam 40 operates to effect the release of the latch mechanism (not shown) so as to enable the walking beam 40 to thereafter be rotated in a clockwise position by the biasing force of the compression spring 58 so as to move the shutter blade elements 16 and 18 toward an aperture defining arrangement as shown in FIG. 3. Thus, the walking beam 40 is thereafter rotated in a clockwise direction as viewed from FIGS. 1, 2 and 3 by the drive spring 58 to move the shutter blade elements 16 and 18 in opposing directions so that primary apertures 20 and 22 overlap to cooperatively define a range of progressively increasing sized effective primary apertures for admitting scene light to the film plane as the blades move from their scene light blocking first arrangement toward their scene light admitting second arrangement.

As is now readily apparent, the control blade 60 is also moved by the walking beam 40 in correspondence with the shutter blade element 18. The primary aperture 62 of the control blade 60 overlaps the primary aperture 22 of the shutter blade element 18 so as to admit scene light to the film plane. The control blade 60 also moves in nonoverlapping relation with respect to the effective photocell sweep secondary aperture cooperatively defined by the overlapping secondary apertures 24 and 26 so as to admit scene light to the photoresponsive element. At the same time, the control blade 60 moves in overlapping relationship with respect to the effective photocell sweep secondary aperture cooperatively defined by the overlapping secondary apertures 28 and 30 so as to block any scene light which might otherwise be admitted to the photoresponsive element 32 from that effective photocell sweep secondary aperture.

In this manner, the ambient photocell sweep secondary apertures 24 and 26 overlap to cooperatively control the admittance of scene light to the photoresponsive element 32 through a second range of progressively increasing sized apertures so as to maintain a first select corresponding relationship between the detected scene light and the scene light admitted to the film plane by the shutter blade elements 16 and 18 as the shutter blades move through their range of progressively increasing sized apertures. This select corresponding relationship maintained between the detected scene light and the film exposing scene light may be better understood by referring to U.S. Pat. No. 4,147,418, entitled "Photographic Exposure Control System with Independent Ambient and Artificial Illumination Control Modes", by George D. Whiteside et al., issued Apr. 3, 1979, in common assignment herewith and now incorporated by reference herein.

The select corresponding relationship maintained between the detected scene light and the film exposing scene light may be further characterized by providing a blocking IR filter in overlapping relationship with respect to the effective photocell sweep secondary aperture defined by the overlapping secondary apertures 24 and 26 in a manner as is more fully described in U.S. patent application Ser. No. 108,219, entitled "Method and Apparatus for Selective Positioning of Spectral Filter During Exposure Control", by Bruce K. Johnson et al., filed Dec. 31, 1979, and U.S. patent application Ser. No. 156,198, entitled "Method and Apparatus for Selectively Positioning Spectral Filter", by Bruce K. Johnson. The IR blocking filter is fabricated preferably to attenuate spectral energy within the broad wave length range to which the photoresponsive element 32 is sensitive (160–1200 nm) and, preferably, to remove substantially all the spectral energy in the IR region from 700–1200 nm of the photocell range. Thus, normal operation in the ambient scene-lighted mode provides for filtering the IR spectral energy from the scene light admitted to the photoresponsive element in order to avoid underexposures which may be due to the large IR content which is normally expected from ambient scene light as a result of chlorophyll from background vegetation.

Continued rotation of the walking beam 40 in a clockwise direction to drive the shutter blade elements 16 and 18 through their range of progressively increasing sized effective primary apertures is stopped by the engagement of the integral hook portion 66 of the control blade 60 with the pivot pin 34. In this manner the control blade 60 operates to stop the progressive movement of the shutter blade elements 16 and 18 at an intermediate aperture defining position which may be preferably in the order of f/22. Limiting the progressive increase in the size of the effective primary aperture in this manner provides for increased depth of field which may be particularly advantageous where the preferred lens arrangement is of the fixed focus type as previously discussed. In addition, limiting the progressive increase in the size of the primary aperture to the intermediate aperture position as shown in FIG. 3 during the ambient scene-lighted mode of operation also facilitates the calibration of the control circuit 90.

Figure 4:
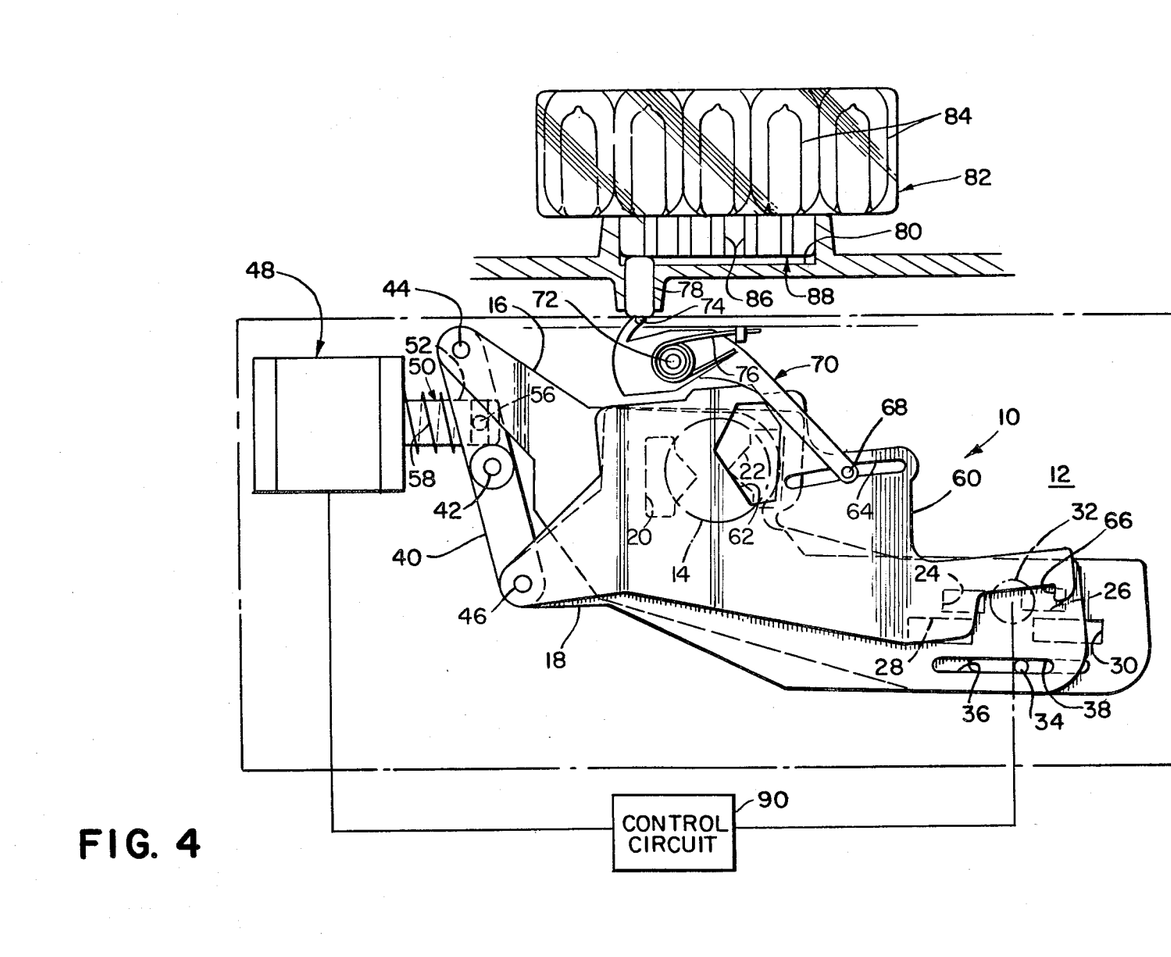
FIG. 4 is a front elevational view of the shutter blade mechanism embodying the control features of this invention as shown in FIG. 1 at still another position from that of FIGS. 1, 2, and 3.

Referring now to FIG. 4, it can be seen that the artificial scene-lighted mode of operation is initiated by first inserting the connecting blade 88 of the linear flash array 82 into the socket 80 in a well-known manner. The connecting blade 88, in turn, engages the top of the push rod 78 so as to slide the push rod downwardly against the top of the bell crank 70, in turn, rotating the bell crank 70 in a counterclockwise direction about its pivot pin 68 so as to rotate the control blade 60 in a counterclockwise direction about the pivot pin 46 to its position as shown in FIG. 4.

Figure 5:
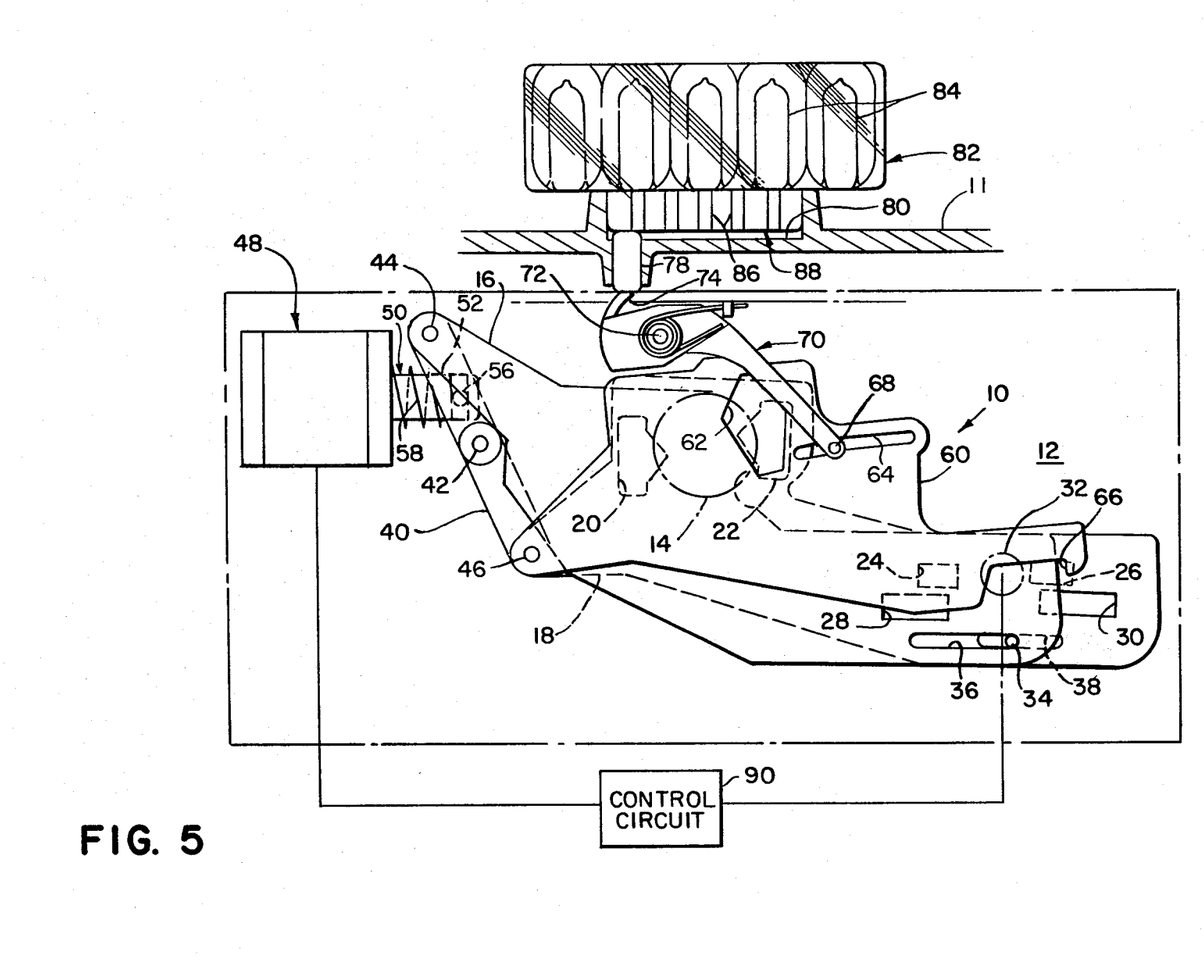
FIG. 5 is a front elevational view of the shutter blade mechanism embodying the control features of this invention as shown in FIG. 1 at still another position from that of FIGS. 1, 2, 3, and 4.
Figure 6:
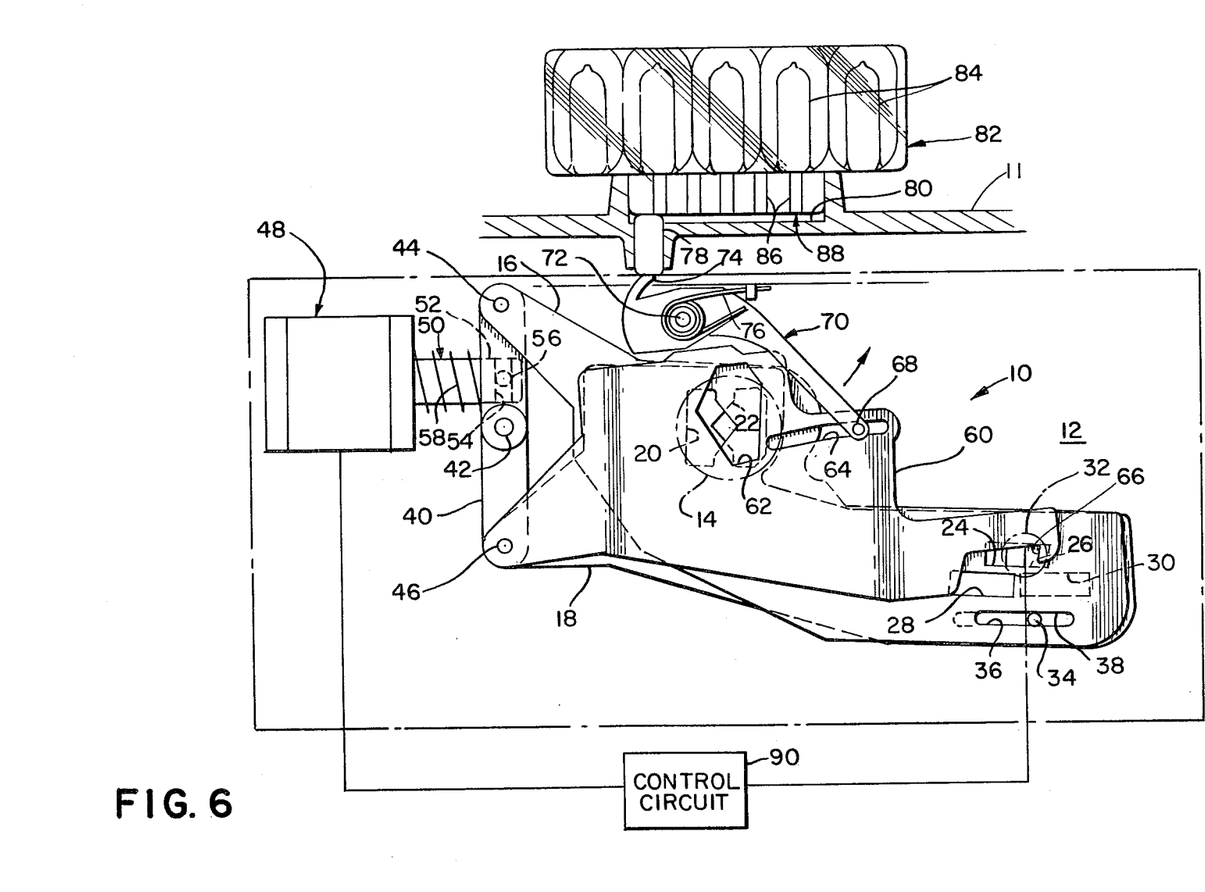
FIG. 6 is a front elevational view of the shutter blade mechanism embodying the control features of this invention as shown in FIG. 1 at still another position from that of FIGS. 1, 2, 3, 4, and 5.

The artificial scene-lighted exposure cycle is initiated in the aforementioned manner by depressing the shutter button so as to energize the solenoid 48 and retract the plunger 50 inwardly to rotate the walking beam in a counterclockwise direction form its position as shown in FIG. 4 to its position as shown in FIG. 5. As previously discussed, this limited clockwise movement of the walking beam 40 operates to effect the release of the latch mechanism (not shown) in a manner as is again fully described in U.S. Pat. No. 4,040,072, supra. The walking beam 40 is thereby permitted to be rotated in a clockwise direction by its drive spring 58 so as to move the shutter blade elements 16 and 18 from their scene light blocking arrangement to their scene light admitting arrangement as seen in FIGS. 6 and 7. As is readily apparent, the control blade 60 moves in correspondence with the shutter blade element 16 so as to define the range of progressively increasing sized apertures. The control blade 60 has also been rotated as a result of the insertion of the linear flash array 82 into the socket 80 such that the hook portion 66 thereof bypasses the pivot pin 34 to allow the shutter blade elements 16 and 18 to move to their largest effective primary aperture defining position which preferably is in the order of f/17 as shown in FIG. 7.

As the walking beam 40 is rotated in the clockwise direction, the ambient photocell sweep secondary apertures 24 and 26 first overlap to admit scene light to the photoresponsive element 32 in the same manner as previously discussed for the ambient scene-lighted mode of operation (see FIG. 6), and the control circuit 90 operates to integrate the output response from the photoresponsive element 32 and to provide a control signal for firing one of the flash lamps 84 in the linear flash array 82 upon the integration level reaching a predetermined value substantially less than the value indicative of a complete exposure in a manner as is fully disclosed in U.S. Pat. No. 4,023,187, entitled "Exposure Control System with Fill Flash Race Condition", by Edwin K. Shenk, issued Oct. 3, 1975, in common assignment herewith and now incorporated by reference herein. Thus, means are provided for firing a flash lamp 84 in a fill-in flash mode of operation wherein the ambient scene light intensity is still sufficiently high so that the control circuit 90 integrates ambient scene light to the required level to fire the flash.

Under conditions where the ambient scene light intensity is not sufficiently high to cause the control circuit 90 to integrate to the required level to fire a flash lamp 84, the walking beam 40 will continue to rotate in a clockwise direction so as to cause the flash photocell sweep secondary apertures 28 and 30 to overlap and admit the major portion of the scene light to the photoresponsive element 32 as the effective aperture defined by the photocell sweep secondary apertures 24 and 26 is overlapped by the hook portion 66 of the control blade 60 (see FIG. 7).

The effective aperture defined by the photocell sweep secondary apertures 28 and 30 is preferably overlapped by an IR passing filter so as to pass scene light in the near infrared region (e.g., 700–1200 nm) for reasons as are fully described in U.S. patent application Ser. Nos. 108,219 and 156,198. Most common materials are characterized by having a more uniform reflectivity in the infrared region and, thus, the IR reflectivity is much less dependent on the visible color (specific visible light absorption). Thus, in scenes where differences in the visible reflectivities are present which can be exaggerated by light sources such as the flashbulbs 84, it becomes preferable to direct the IR radiation to the photoresponsive element 32 since there will be less reflectivity differences between, for example, a subject's facial skin and the surrounding clothing or other objects. This substantially minimizes the degree of under- or overexposure in such situations. It is therefore apparent that under conditions of artificial illumination which tend to exaggerate scene differences in reflectivities, it becomes preferable to have the photoresponsive element respond to the infrared scene radiation.

The maximum effective primary aperture to which the shutter blade elements 16 and 18 may move as previously discussed has been increased for the artificial scene-lighted mode of operation in order to increase the effective range of the flash 82. Since the range of the photographic apparatus is limited when operated in the artificial scene-lighted mode of operation, the decreased depth of field attendant the larger f/17 maximum effective primary aperture may be easily accommodated even with the preferred fixed focus lens arrangement previously discussed. Thus, the flash photocell sweep secondary apertures 28 and 30 overlap to cooperatively control the admittance of scene light to the photoresponsive element 32 through a third range of progressively increasing sized apertures in a manner maintaining a second select corresponding relationship between the detected scene light and the scene light admitted to the film plane by the shutter blade elements 16 and 18 as the shutter blades move through their range of progressively increasing sized apertures. This select corresponding relationship may be further characterized by the infrared admitting filter in the manner as previously described.

In the event that the ambient scene light intensity is sufficiently low that a flash lamp 84 is not fired as a result of scene light integration in the aforementioned manner, there will be provided a time signal to fire a flash lamp when the shutter blade elements 16 and 18 are in their maximum effective primary aperture defining position as shown in FIG. 7 in a manner as is again fully disclosed in U.S. Pat. No. 4,023,187, supra. After the flash is fired, reflected scene light will be integrated until reaching the trigger level corresponding to a complete exposure at which instant the control circuit 90 will provide the requisite signal to energize the solenoid 48, withdraw the plunger 52, rotate the walking beam in a counterclockwise direction, and drive the shutter blade elements 16 and 18 back to their scene light blocking arrangement as shown in FIG. 4.

The exposure control system of this invention provides a means by which the corresponding relationship between the detected scene light and the scene light admitted to the film plane by the blade mechanism may be specially tailored for either the ambient scene-lighted mode of operation or the artificially scene-lighted mode of operation using only a single photocell. In addition, the maximum effective primary aperture size to which the blades may be opened during the ambient scene-lighted mode of operation is automatically reduced to provide an increased depth of field in comparison to the artificially scene-lighted mode of operation. This invention may be embodied in other specific forms such as cameras having variable focus objective lenses without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of the claims are therefore intended to be embraced therein.

What is claimed is:

1. A photographic camera apparatus for use in either an ambient scene-lighted mode or an artificially scene-lighted mode wherein the camera includes means for mounting photographic film material at a given focal plane, said camera comprising:

a blade mechanism;

means for mounting said blade mechanism for displacement between a first arrangement wherein it precludes scene light from reaching the film plane and a second arrangement wherein it defines a maximum size aperture, said blade mechanism serving to define a first range of progressively increasing sized apertures as it moves from its said first arrangement to its said second arrangement;

control means cooperatively associated with said blade mechanism and said mounting means and responsive to camera operation in the ambient scene-lighted mode for limiting displacement of said blade mechanism along said predetermined path to an intermediate arrangement wherein it defines an aperture size less than said maximum aperture size while simultaneously detecting scene light in a manner maintaining a first select corresponding relationship between the detected scene light and the scene light admitted to the focal plane by said blade mechanism as it moves through said range of apertures between said first and intermediate arrangements and responsive to camera operation in the artificially scene-lighted mode for allowing displacement of said blade mechanism along said predetermined path between its said first and second arrangements while simultaneously detecting scene light in a manner maintaining a second select corresponding relationship between the detected scene light and the scene light admitted to the focal plane independent of said first select corresponding relationship by said blade mechanism as it moves through said range of apertures between said first and second arrangements; and selectively actuatable drive means for initially displacing said blade mechanism from its said first arrangement toward its said second arrangement, and for thereafter displacing said blade mechanism back toward its said first arrangement in response to said detected scene light to define an exposure cycle.

2. The photographic apparatus of claim 1 wherein: said blade mechanism includes two overlapping shutter blade elements each having a respective primary aperture therethrough, said primary apertures being cooperatively arranged to define said range of progressively increasing sized apertures, and said control means includes a control blade mounted in overlapping relation with respect to said overlapping shutter blade elements for movement in correspondence with one of said overlapping blade elements, said control means responding to said ambient scene-lighted mode by positioning said control blade to engage a fixed stop member as said blade elements move through said range of apertures so as to stop said blade elements at said intermediate position, said control means further responding to said artificially scene-lighted mode by positioning said control blade to bypass said stop member as said blade elements move through said range of apertures.

3. The photographic apparatus of claim 2 wherein said blade mounting means comprises a rotatably mounted walking beam pivotally connected at one end to one of said shutter blade elements and at the other end to the other of said shutter blade elements and to said control blade and wherein said control means positions said control blade by pivoting said control blade about its point of pivotal connection to said walking beam.

4. The photographic apparatus of claim 3 wherein said scene light detecting means includes a photoresponsive element, and a pair of spaced apart secondary apertures in each of said overlapping blades wherein a first one of said secondary apertures in one of said blade elements cooperates with a first one of said secondary apertures in the other of said blade elements to define a second range of progressively changing sized apertures for admitting scene light to said photoresponsive element as said blade elements move between said first and second arrangements, said first ones of said secondary apertures being cooperatively configured to provide said first select corresponding relationship between the detected scene light and the scene light admitted to the focal plane, and wherein a second of said secondary apertures in said one of said blade elements cooperates with a second of said secondary apertures in said other of said blade elements to define a third range of progressively changing sized apertures for admitting scene light to said photoresponsive element as said blade moves between said first and second arrangements, said second apertures being cooperatively configured to provide said second select corresponding relationship between the detected scene light and the scene light admitted to the focal plane, said control means responding to said ambient scene-lighted mode by pivoting said control blade into a first position overlapping said second ones of said secondary apertures and to said artificially-lighted mode by pivoting said control blade into a second position out of overlapping relation with respect to said second ones of said secondary apertures.

5. The photographic apparatus of claim 4 wherein said mounting means comprises an elongated slot in each of said shutter blade elements and a fixed pin member extending through said elongated slots so as to slidably guide said shutter blades and at the same time define said fixed stop member and wherein said control blade defines a hooked portion for sliding engagement with said pin member as said blade elements move through said range of apertures during said ambient scene-lighted mode.

6. The photographic apparatus of claim 4 including means for releasably connecting to a source of artificial illumination and wherein said control means responds to the connection of a source of artificial illumination to said connecting means for pivoting said control blade from its said first position to its said second position, said control means then responding to the disconnection of the source of artificial illumination from said connecting means by pivoting said control blade from its said second position back to its said first position.

7. The photographic apparatus of claim 4 wherein said first and second select corresponding relationships between detected scene light and scene light admitted to the film plane have different spectral frequency characteristics.

8. A photographic camera apparatus for use in either an ambient scene-lighted mode or an artificially scene-lighted mode wherein the camera includes means for mounting photographic film material at a given focal plane, said camera comprising:
a blade mechanism including two overlapping shutter blade elements each having a respective primary aperture therethrough;
means for mounting said blade mechanism for displacement between a first arrangement wherein it precludes scene light from reaching the film plane and a second arrangement wherein said primary apertures overlap to define a maximum size aperture, said primary apertures being cooperatively arranged to define a first range of progressively increasing sized apertures as said blade mechanism moves from its said first arrangement to its said second arrangement;
means for controlling displacement of said blade mechanism along said predetermined path and including a control blade mounted in overlapping relation with respect to said overlapping shutter blade elements for movement in correspondence with one of said overlapping blade elements, said control means responding to said ambient scene-lighted mode by positioning said control blade in a first position to engage a fixed stop member as said blade elements move through said range of apertures so as to stop said blade elements at an intermediate position wherein it defines an aperture size less than said maximum aperture size, said control means further responding to said artificially scene-lighted mode by positioning said control blade in a second position to bypass said stop member as said blade elements move through said range of apertures; and
selectively actuatable drive means for initially displacing said blade mechanism from its said first arrangement toward its said second arrangement and for thereafter displacing said blade mechanism back toward its said first arrangement to define an exposure cycle.

9. The photographic apparatus of claim 8 wherein said mounting means comprises a rotatably mounted walking beam pivotally connected at one end to one of said shutter blade elements and at the other end to the other of said shutter blade elements and to said control blade and wherein said control means positions said control blade by pivoting said control blade about its point of pivotal connection to said walking beam.

10. The photographic apparatus of claim 9 wherein said control blade includes an elongated slot therein and wherein said control means includes a bell crank with a pin at one end thereof slidably engaged with respect to said control blade slot such that rotation of said bell crank operates to pivot said control blade between its two said positions.

11. The photographic apparatus of claim 10 wherein: said mounting means comprises an elongated slot in each of said shutter blade elements and a fixed pin member extending through said elongated slots so as to slidably guide said shutter blades and at the same time define said fixed stop member and wherein said control blade defines a hooked portion for sliding engagement with said pin member as said blade elements move through said range of apertures during said ambient scene-lighted mode.

12. The photographic apparatus of claim 11 including means for releasably connecting to a source of artificial illumination and wherein said control means responds to the connection of a source of artificial illumination to said connecting means by rotating said bell crank so as to pivot said control blade from its said first position to its said second position, said control means then responding to the disconnection of the source of artificial illumination from said connecting means by allowing said bell crank to pivot said control blade from its said second position back to its said first position.

13. A photographic camera apparatus for use in either an ambient scene-lighted mode or an artificially scene-lighted mode wherein the camera includes means for mounting photographic film material at a given focal plane, said camera comprising:
a blade mechanism including two overlapping shutter blade elements each having a respective primary aperture therethrough and a pair of spaced apart secondary apertures;
a photoresponsive element stationed to receive scene light from selected ones of said secondary apertures;
means for mounting said blade mechanism for displacement between a first arrangement wherein it precludes scene light from reaching the film plane and a second arrangement wherein said primary apertures overlap to define a maximum size aperture, said primary apertures being cooperatively arranged to define a first range of progressively increasing sized apertures as said blade mechanism moves from its said first arrangement to its said second arrangement and said secondary apertures being cooperatively arranged such that a first one of said secondary apertures in one of said blade elements cooperates with a first one of said secondary apertures in the other of said blade elements to define a second range of progressively changing sized apertures for admitting scene light to said photoresponsive element as said blade elements move between said first and second arrangements and a second one of said secondary apertures in said one of said blade elements cooperates with a second one of said secondary apertures in said other of said blade elements to define a third range of progressively changing sized apertures for admitting scene light to said photoresponsive element as said blade elements move between said first and second arrangements;

means for controlling the admission of scene light through said secondary apertures including a control blade mounted in overlapping relation with respect to said overlapping shutter blade elements for movement in correspondence with one of said overlapping blade elements, said control means responding to said ambient scene-lighted mode by pivoting said control blade into a first position overlapping said second one of said secondary apertures and to said artificially-lighted mode by pivoting said control blade into a second position out of overlapping relation with respect to said second ones of said secondary apertures; and selectively actuatable drive means for initially displacing said blade mechanism from its said first arrangement toward its said second arrangement, and for thereafter displacing said blade mechanism back toward its said first arrangement in response to said detected scene light to define an exposure cycle.

14. The photographic apparatus of claim 13 wherein said blade mounting means comprises a rotatably mounted walking beam pivotally connected at one end to one of said shutter blade elements and at the other end to the other of said shutter blade elements and to said control blade and wherein said control means positions said control blade by pivoting said control blade about its point of pivotal connection to said walking beam.

15. The photographic apparatus of claim 14 wherein said control blade includes an elongated slot therein and wherein said control means includes a bell crank with a pin at one end thereof slidably engaged with respect to said control blade slot such that rotation of said bell crank operates to pivot said control blade between its two said positions.

16. The photographic apparatus of claim 15 including means for releasably connecting to a source of artificial illumination and wherein said control means responds to the connection of a source of artificial illumination to said connecting means for rotating said bell crank so as to pivot said control blade from its said first position to its said second position, said control means then responding to the disconnection of the source of artificial illumination from said connecting means by allowing said bell crank to pivot said control blade from its said second position back to its said first position.

* * * * *